March 14, 1967   D. M. BLACK   3,308,507
EXTRUSION APPARATUS
Filed Sept. 17, 1965   3 Sheets-Sheet 2

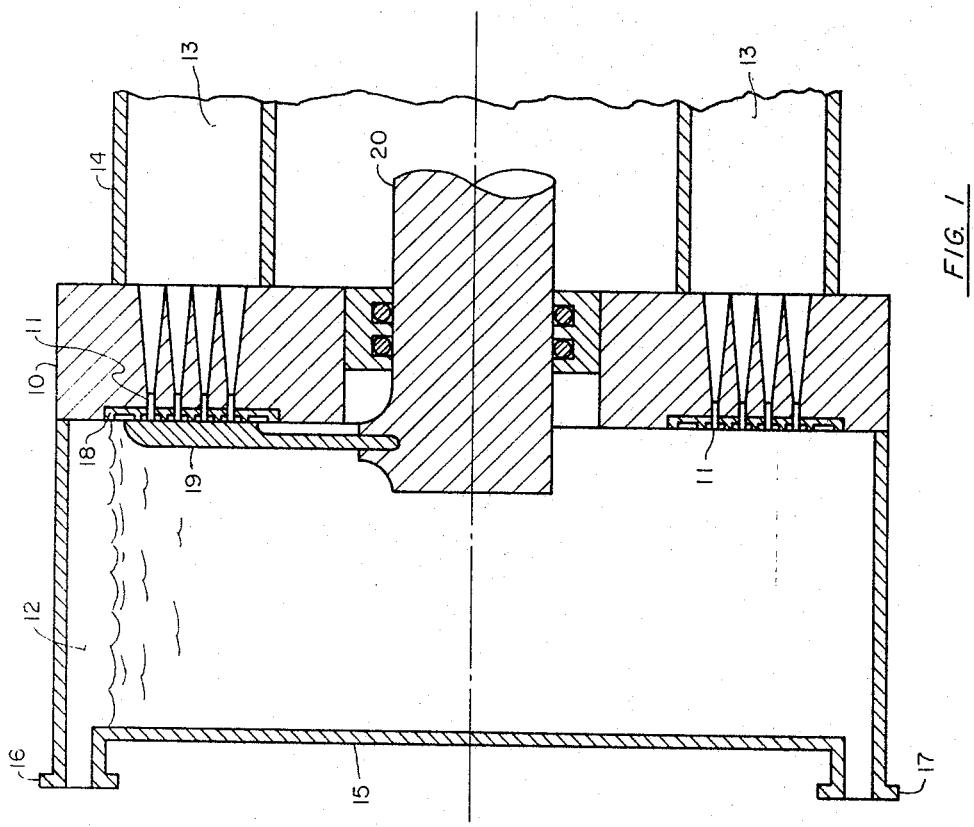

DONALD M. BLACK
INVENTOR.

BY Fred S. Valls
Attorney

DONALD M. BLACK
INVENTOR.

BY

United States Patent Office 3,308,507
Patented Mar. 14, 1967

3,308,507
EXTRUSION APPARATUS
Donald M. Black, Odessa, Tex., assignor to Rexall Drug and Chemical Company, Los Angeles, Calif., a corporation of Delaware
Filed Sept. 17, 1965, Ser. No. 488,036
2 Claims. (Cl. 18—12)

This invention relates to an extrusion apparatus for thermoplastic materials, and more particularly, to an improved die face plate for the extrusion of thermoplastic polymeric materials in granular form.

The use of apparatus for the underwater extrusion of thermoplastic pellets or granules is widely known. Generally, these apparatus include an extruder adapted to feed thermoplastic material in the molten state to an extruding die having a plurality of die orifices. As the thermoplastic material is extruded through the die orifices in the form of rods or thread, preferably of circular or rounded cross-section, the latter are cut transversely into small fragments. Concurrent with the extrusion through the die orifices and prior to or simultaneously with the cutting sequences, the material is immersed in a body of cooling liquid. In this manner granules or pellets of thermoplastic polymers are produced which can have convex, or substantially spherical surfaces. The granules or pellets can vary in shape, from curved discs through substantially spherical shapes to elongated pellets of round-ended cylindrical shape, depending on the frequency of cutting, size of extrusion orifices, extrusion feed rate and other varied factors.

In general, the aforedescribed apparatus includes a die plate member having a plurality of die orifices extending therethrough whereby the molten thermoplastic material may be extruded. Usually a rotary cutter is provided to rotate in sliding relation with the face of the die plate member in order to fragment the rods or threads of material being extruded through the orifices. Inasmuch as the die plate member is generally heated in order to maintain the material to be extruded in the required molten state, it becomes necessary to provide a thermal barrier between tthe die plate member and the cooling liquid into which the thermoplastic material is extruded. Accordingly, the surface of the die plate member which is contacted by the cooling liquid and by the rotary cutter is partially faced with a heat insulating cover or die face plate. Since most heat insulating materials known are generally soft and have poor wearing properties when contacted in sliding engagement by a rotary cutter blade, each of the die orifices is surrounded by a small circular wear plate, constituted of a hardened metallic composition, which are set into recesses provided in the die face plate. As a result, the rotary cutter will then slide or abrade against the wear plates which are positioned in coplanar relationship with the surface of the die face plate.

A problem which is frequently encountered in the foregoing prior art apparatus, is that of uneven wear of the rotary cutter blades. The rotation of the cutter blade past the small circular wear plates surrounding the die orifices will in effect abrade the blade at those location at a greater wear rate than the portions of the blade which contact only the softer insulating material of the die face plate. Consequently, the cutter blade surface wears into a serrated contour which will cause the raised portions thereof, facing the die face plate material, to cut into the die face plate. This necessitates frequent replacement of expensive die face plates, requires that the unevenly worn cutter blades be sharpened at frequent intervals, and results in production stoppages due to the shut-down of the apparatus caused by the foregoing.

The extrusion apparatus according to this invention overcomes substantially the foregoing and other problems encountered in the prior art by providing an improved die plate member having a die face plate and wear plate means which will prevent uneven wear of the rotary cutter blade and concurrently eliminate the need for replacing the die face plate. Essentially, the die plate member according to this invention has wear plates surrounding the die orifices, with the wear plates set into the die face plate being dimensioned radially across the die face plate so that substantially the entire length of the cutter blade adjacent to the surface of the die face plate will contact the wear plates during rotation of the cutter. This, then, will assure that the cutter blade will be abraded and wear uniformly over its length, thus eliminating the need for frequent sharpening thereof, while simultaneously avoiding damage to the die face plate, thereby providing a much more efficient and economical apparatus than heretofore known in the art.

Accordingly, it is an object of the present invention to provide an improved extrusion apparatus for the extrusion of granules or pellets of a thermoplastic material.

Another object of the present invention is to provide an improved die plate member in an apparatus for the extrusion of granules or pellets of a thermoplastic polymeric material.

A more particular object of the present invention is to provide a die plate member in an extrusion apparatus having improved wear plate means affording even wear on a rotary cutter rotating thereagainst to thereby greatly increase the service and operating life of the apparatus components in the extrusion of granular thermoplastic material.

The manner in which these and other objects and advantages of the present invention will be attained will become apparent from the following detailed description and drawings, in which:

FIGURE 1 is a cross-sectional view, partially in schematic, of an extrusion apparatus according to this invention;

Figure 3:
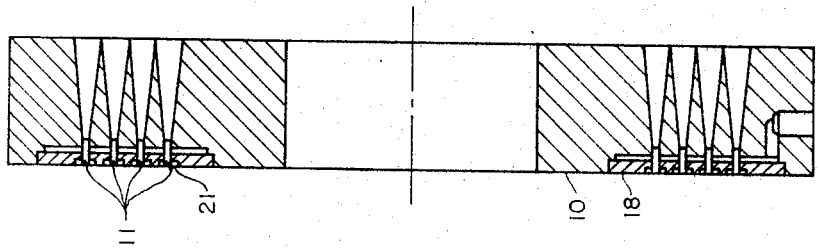
FIGURE 3 is a sectional view on line 3—3 of FIGURE 2.

Referring now in detail to the drawings, the extrusion apparatus includes a die plate member 10. A plurality of narrow die orifices 11 are provided in the die plate member 10 and extend therethrough to facilitate the extrusion of a plurality of rods or threads of a thermoplastic material into a chamber 12. The thermoplastic material is fed in a molten state to the die orifices 11 by means of passages 13 provided in a housing 14, the latter of which can be fastened to die plate member 10.

In order to assure that the thermoplastic material passing through the die plate member 10 is maintained in the required molten state a heating medium can be circulated through passageways provided therefor in the die plate member.

The chamber 12 can be enclosed by means of a liquid-tight casing 15 having an inlet port 16 and an outlet port 17. A suitable cooling liquid, for example, water, can be supplied to chamber 12 through inlet port 16 so as to place substantially all of the die orifices 11 in contact with the liquid. As a result, the thermoplastic material being extruded through the die orifices 11 into chamber 12 will be cooled on contact with the cooling liquid. Since there is an appreciable temperature differential between the die plate member 10 and the cooling liquid, due to the hot thermoplastic material passing through the die orifices 11, it is desirable to insulate the portion of the die plate member 10 which would normally be contacted by the cooling liquid. Accordingly, in view of the foregoing, an insulated die face plate 18 is provided on the surface of the die plate member 10 facing the cooling liquid. Generally, the die face plate 18 can be constituted of Bakelite, ceramic or any other suitable heat insulative material.

As the thermoplastic material is extruded through die orifice 11 into chamber 12 it is sliced into a multiplicity of small granules or pellets by a rotary cutter 19 fastened to a suitably journaled rotatable shaft 20. The cutter 19 has an elongated blade surface adapted to rotate in sliding contact with the surface of die face plate 18 past the die orifices, and to thereby slice the rods or threads of thermoplastic material extruding therethrough into granules or pellets.

Figure 2:
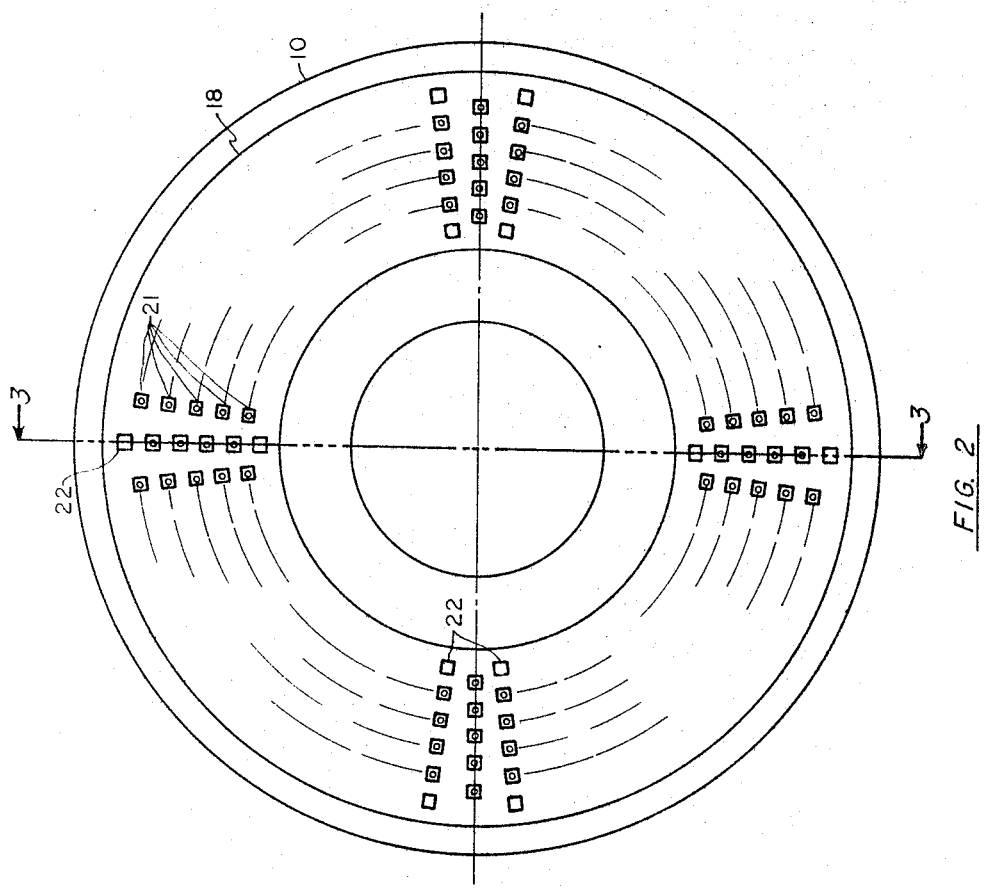
FIGURE 2 is a front plan view of an extrusion die plate according to this invention.
Figure 4:
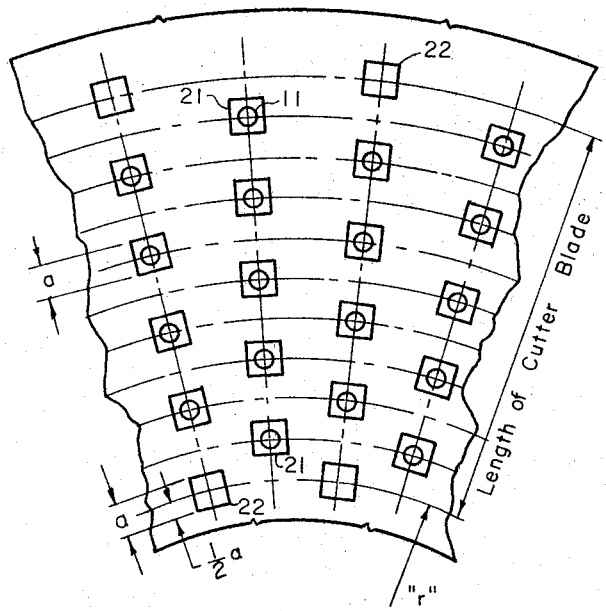
FIGURE 4 is an enlarged partial view of a portion of the die plate in FIGURE 2, showing the arrangement of the wear plates according to this invention.

In order to prevent the blade of cutter 19 from digging into the relatively soft surface of the die face plate 18 and damaging the latter, each of the die orifices 11 is provided with a hard metal wear plate 21, as shown in FIGURES 2 and 4. Each wear plate 21 consists of a substantially rectangular or square metal plate surrounding each die orifice 11, and is set into recesses in die face plate 18 so as to be substantially flush and coplanar with the surface thereof. This, in effect, will create a hard, smooth surface against which the cutter 19 can rotate. Since it is important that the blade of the cutter 19 wears evenly, so as to prevent the formation of die face plate-damaging serrations therein, the wear plates are dimensioned whereby they effectively constitute a uniform wearing surface for substantially the full radially extending length of the cutter blade.

The novel and advantageous dimensioning of the wear plates 21 can best be understood by referring to FIGURE 4 of the drawings. In this instance, the radial height of each wear plate is defined as distance $a$, with the radial center of each die orifice 11 being spaced centrally of each wear plate so as to divide them into two halves ($\frac{1}{2}a + \frac{1}{2}a$). Accordingly, each succeeding radially outward progressing ring of die orifices is spaced with respect to the next ring by a radial displacement equal to dimension $a$. Thus, the innermost ring of die orifices 11 is at a radial distance $r$ from the central axis of the die face plate 18, the next ring at a distance $r+a$, the next at a distance $r+2a$, and so forth. In order to avoid overlapping of the wear plates they are circumferentially staggered in alternate rows of die orifices. Consequently, only every second radial row or ring of wear plates is in radial alignment.

Inasmuch as the full sweep or blade length of the cutter 19 may exceed the combined radial length of the rows of wear plates 21, a number of blank wear plates 22 can be positioned radially inwardly and outwardly of the innermost and outermost rows of wear plates 21 surrounding the die orifices.

Essentially, wear plates 22 are identical in dimensions wear plates 21, however, the former have no provisions for die orifices and are designed primarily for the purpose of providing a uniform wear contact surface for the entire blade length of the cutter 19.

Figure 5:
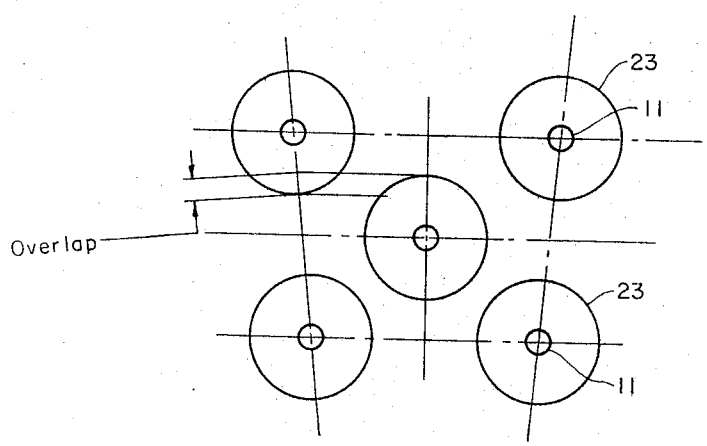
FIGURE 5 is an enlarged view similar to FIGURE 4, showing an alternate embodiment of the wear plates.

Another embodiment of the present invention is shown in FIGURE 5 of the drawings, where in lieu of the rectangular wear plates 21, large circular or disc-shaped wear plates 23 can be provided to function in the same manner as wear plates 21. The disc-shaped wear plates 23 in radially adjacent rows of die orifices 11 must be sufficiently large to provide a substantial radial overlap in order to give sufficient metallic sliding support to the rotating cutter 19 over the full length of the latter, and thereby effect uniform wear of the cutter blade.

From the foregoing it can thus be ascertained that the present invention provides for an improved die face plate design adapted for underwater pelletizers or extruders, having superior characteristics in effecting uniform and smooth wear over the entire cutter blade length by providing metal-to-metal contact at all radial points thereof. A further feature of this invention is that it greatly reduces the need for cutter blade resharpening as a result of the even wear of the latter caused by the advantageously dimensioned wear plates.

While particular embodiments of this invention are shown above, it will be understood that the invention is obviously subject to variations and modifications without departing from its broader aspects.

What is claimed is:

1. In an extrusion apparatus for converting thermoplastic polymeric materials to granular form, means for extruding said materials comprising a die plate member, said die plate member having a plurality of die orifices radially disposed about a central axis, rotary cutter means mounted for rotation about said axis for cutting the extruded material into said granules, said cutter rotating about said axis in substantially sliding contact with the face of said plate member, a plurality of wear plate means located one each about each of said die orifices, said wear plate means being positioned in recesses within said die plate member in substantially coplanar relation to the surface of said die plate member adjacent said rotary cutter, said wear plate means being of generally rectangular configuration and dimensioned whereby the radially outermost point on each wear plate in any one row of die orifices is at least equal to the radial distance from said central axis to the innermost radial point on a wear plate of the adjacent radially outer row of die orifices, so as to effect uniform wear along substanaially the entire length of said cutter during rotation thereof.

2. In an extrusion apparatus for converting thermoplastic polymeric materials to granular form, means for extruding said materials comprising a die plate member, said die plate member having a plurality of die orifices radially disposed about a central axis, rotary cutter means mounted for rotation about said axis for cutting the extruded material into said granules, said cutter rotating about said axis in substantially sliding contact with the face of said die plate member, a plurality of wear plate means located one each about each of said die orifices, said wear plate means being positioned in recesses within said die plate member in substantially coplanar relation to the surface of said die plate member adjacent said rotary cutter, said wear plate means being of generally circular configuration and dimensioned whereby the radially outermost point on each wear plate in any one row of die orifices is at a greater radial distance from said central axis than the innermost radial point on a wear plate of the next adjacent radially outer row of die orifices, so as to effect uniform wear along substantially the entire length of said cutter during rotation thereof.

References Cited by the Examiner

UNITED STATES PATENTS

| | | |
|---|---|---|
| 2,371,678 | 3/1945 | Grosser. |
| 2,391,050 | 12/1945 | Horn. |
| 2,862,243 | 12/1958 | Farr et al. |
| 3,114,169 | 12/1963 | Palmer et al. _____ 18—12 |
| 3,245,112 | 4/1966 | Williamson _____ 18—8 |

FOREIGN PATENTS

| | | |
|---|---|---|
| 229,711 | 2/1925 | Great Britain. |

WILLIAM J. STEPHENSON, *Primary Examiner.*